(12) United States Patent
Yamanaka et al.

(10) Patent No.: US 7,492,696 B2
(45) Date of Patent: Feb. 17, 2009

(54) OPTICAL DISK MEDIUM AND OPTICAL DISK APPARATUS

(75) Inventors: Yutaka Yamanaka, Tokyo (JP); Kinji Kayanuma, Tokyo (JP); Chosaku Noda, Tokyo (JP); Hiroharu Satoh, Tokyo (JP); Hideaki Ohsawa, Tokyo (JP)

(73) Assignees: NEC Corporation, Tokyo (JP); Kabushiki Kaisha Toshiba, Tokyo (JP)

( * ) Notice: Subject to any disclaimer, the term of this patent is extended or adjusted under 35 U.S.C. 154(b) by 712 days.

(21) Appl. No.: 10/778,922

(22) Filed: Feb. 17, 2004

(65) Prior Publication Data

US 2004/0228247 A1    Nov. 18, 2004

(30) Foreign Application Priority Data

Feb. 18, 2003    (JP)    ............................. 2003-040340

(51) Int. Cl.
G11B 7/24    (2006.01)
(52) U.S. Cl. .................. 369/275.3; 369/47.28
(58) Field of Classification Search ........................ None
See application file for complete search history.

(56) References Cited

U.S. PATENT DOCUMENTS

| 5,303,225 | A | * | 4/1994 | Satoh et al. | ............. | 369/275.3 |
|---|---|---|---|---|---|---|
| 5,452,284 | A | * | 9/1995 | Miyagawa et al. | ....... | 369/44.28 |
| 5,477,526 | A | | 12/1995 | Inoue | | |
| 5,862,112 | A | * | 1/1999 | Nagai et al. | ............... | 369/44.36 |
| 5,883,878 | A | | 3/1999 | Satoh et al. | | |
| 6,038,209 | A | | 3/2000 | Satoh | | |
| 6,266,318 | B1 | * | 7/2001 | Honda et al. | ............. | 369/275.3 |
| 6,337,839 | B1 | * | 1/2002 | Nakane et al. | ........... | 369/59.25 |

FOREIGN PATENT DOCUMENTS

| JP | 07-065510 | 3/1995 |
|---|---|---|
| JP | 2000-298842 | 10/2000 |
| JP | 2001-143273 | 5/2001 |

OTHER PUBLICATIONS

Japanese Office Action dated Mar. 26, 2008 with Partial English Translation.

* cited by examiner

Primary Examiner—Joseph Feild
Assistant Examiner—Tawfik Goma
(74) Attorney, Agent, or Firm—McGinn IP Law Group, PLLC

(57) ABSTRACT

The length of a format modulation area in an address segment is limited to be 25% of the address-segment length or less, and the position of the format modulation area is selectable two possible positions. Subsequently, where a CLV optical-disk medium is used, wobble modulation areas in adjacent recording tracks do not overlap each other in the radius direction.

8 Claims, 11 Drawing Sheets

PRIOR ART    REPRODUCTION SIGNAL WITHOUT INTERFERENCE

PRIOR ART    REPRODUCTION SIGNAL WITH INTERFERENCE

OUTER RADIUS DIRECTION

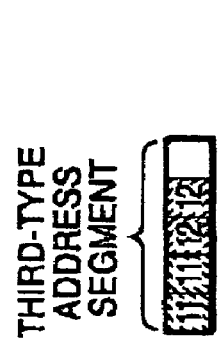
FIG. 11A  FIG. 11B  FIG. 11C
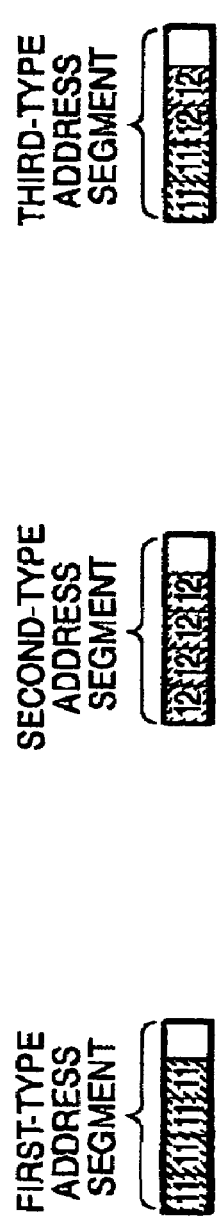
FIG. 12A
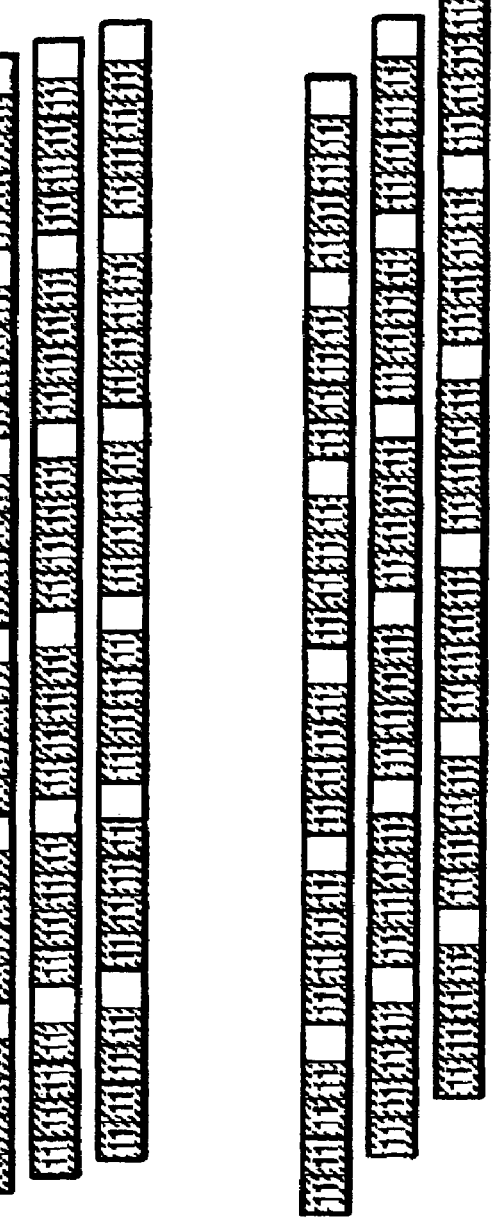
FIG. 12B

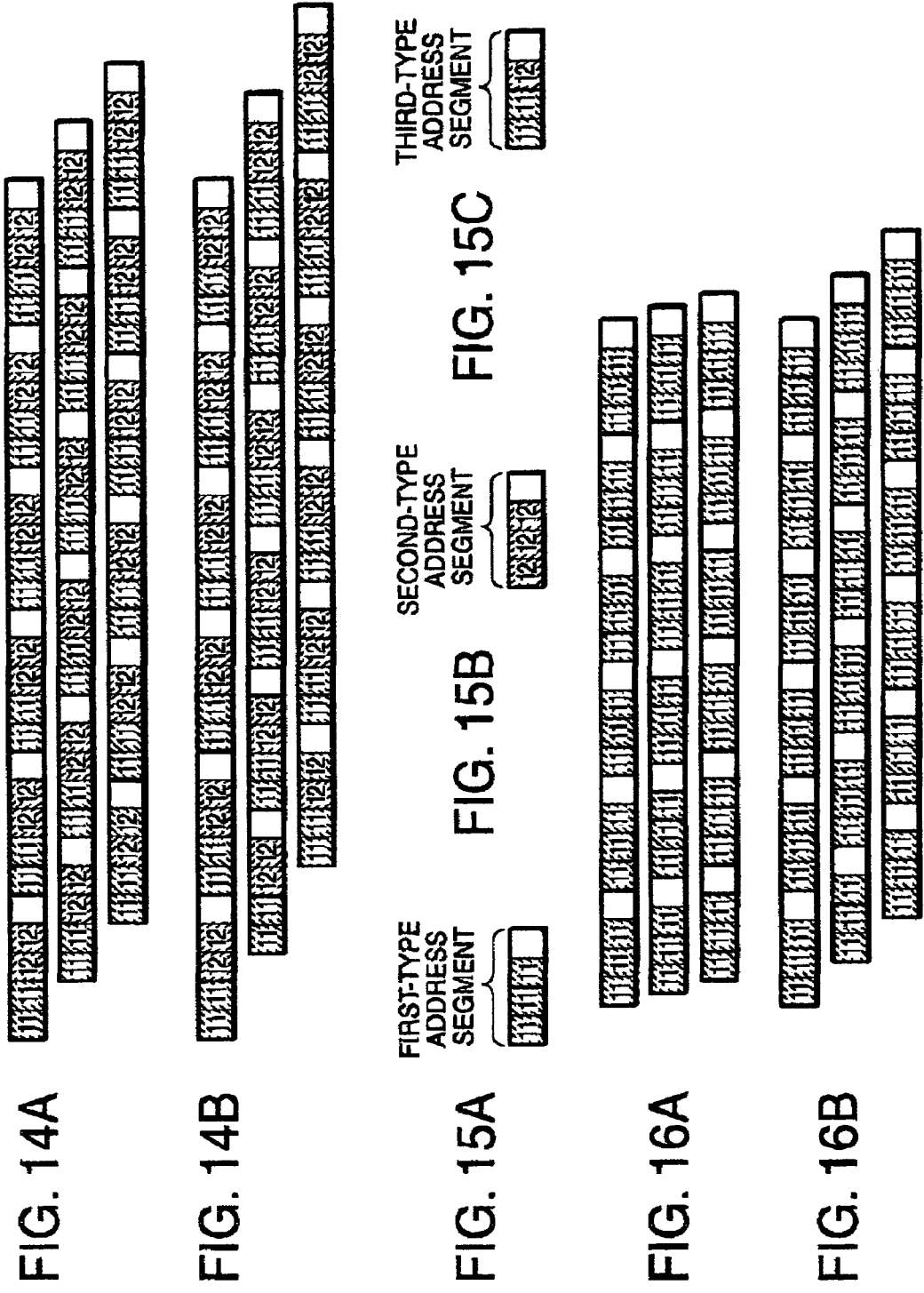

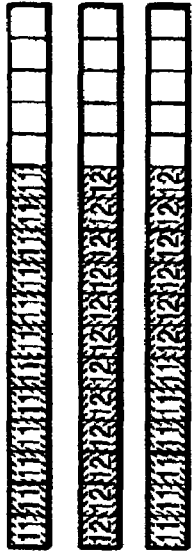
FIG. 19A FIRST-TYPE ADDRESS SEGMENT
FIG. 19B SECOND-TYPE ADDRESS SEGMENT
Fig. 19C THIRD-TYPE ADDRESS SEGMENT
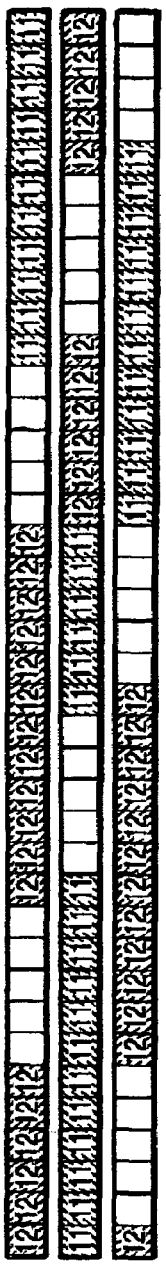
FIG. 20A
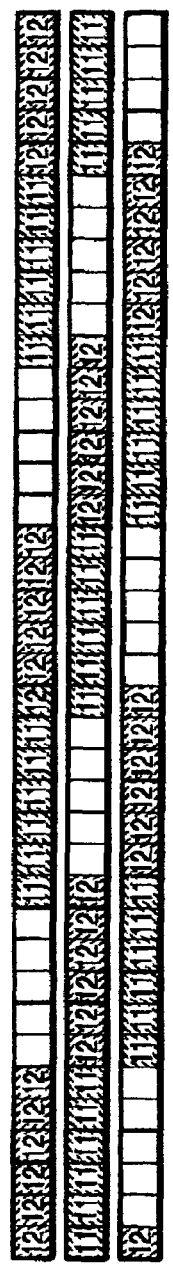
FIG. 20B
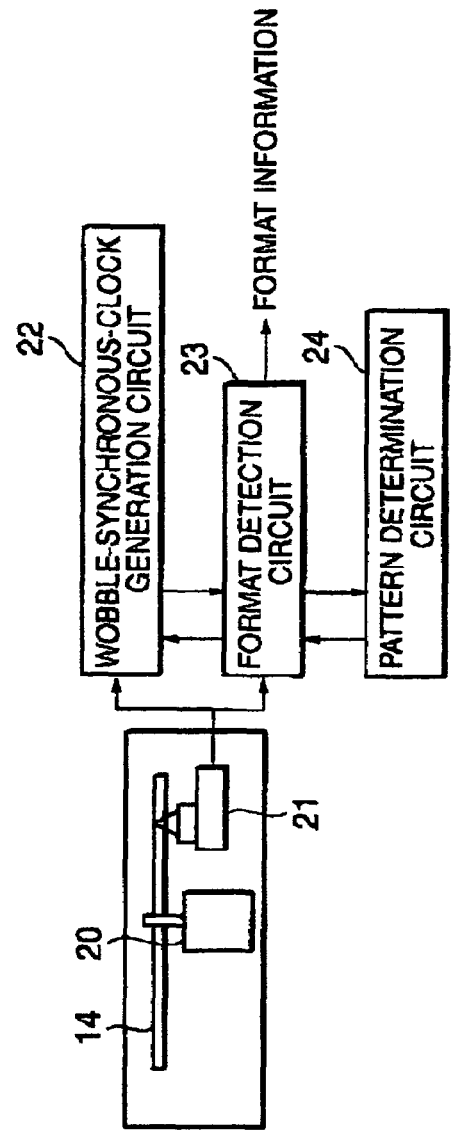
FIG. 21

OPTICAL DISK MEDIUM AND OPTICAL DISK APPARATUS

BACKGROUND OF THE INVENTION

1. Field of the Invention

The present invention relates to an optical disk medium having optical spots used for recording and reproducing information and an optical disk apparatus for performing the recording and reproducing.

2. Description of the Related Art

FIG. 1 is a schematic diagram of a known recording type optical disk medium. An optical disk 4 has a spiral groove formed as a guide of a recording track 3. This recording track 3 is divided into a plurality of address segments 5 with a predetermined length. Format information indicating an address or the like is stored in each of the address segments 5.

Hitherto, format information is formed as an emboss prepit provided at the head of the address segment 5. Recently, however, the groove of the recording track 3 meanders a little, whereby the meandering periodicity of the recording track 3 is modulated for embedding the format Information therein. This method is referred to as a wobble modulation method. According to the above-described configuration, the format information can be stored at a position overlapping data stored on the recording track 3. Since the interruption of the stored data is eliminated, capacity loss due to the format information reduces.

For example, a compact disk-recordable/rewritable (CD-R/RW) uses modulation signals with changed wobble periodicity and +R/RW uses modulation signals of a constant frequency and changed wobble phase.

FIG. 2A illustrates an example recording track with modulated wobble phase. The recording track 3 meanders with predetermined periodicity. The phase of a predetermined part in a modulation area storing format information is reversed 180 degrees. This part is used as data. Wobble signals are detected from these meandering grooves, as high-frequency components of push-pull signals for detecting track-error signals. FIG. 2B is an example detected wobble signal of one of the grooves of the recording track shown in upper part of FIG. 2A, where no interference from the other groove adjacent thereto occurs. FIG. 2B clearly shows that a signal corresponding to the meandering groove is detected.

However, in the groove shown in the lower part of FIG. 2A and that is adjacent to the upper groove, format information corresponding to another address segment is formed. In this case, if the recording density increases and interference caused by a wobble signal of the adjacent groove occurs, wobble signals detected from the recording track 3 become different from one another. FIG. 2C illustrates an example wobble signal generated where interference is generated due to an opposite-phase modulation waveform. This opposite-phase modulation waveform is generated in the case where a predetermined modulation area of one of the grooves shown in FIG. 2A corresponds to a modulation area of the adjacent groove. That is to say, in FIG. 2A, when the optical disk medium is viewed from the radius direction, the predetermined modulation area of one of the grooves overlaps the modulation area of the adjacent groove. When at least one modulation area on a predetermined groove of the recording track 3 overlaps a modulation area on a groove adjacent to the predetermined groove in the above-described manner, this state is hereinafter described as "overlapping each other in the radius direction". Further, if no modulation area on a predetermined groove of the recording track 3 overlaps a modulation area on a groove adjacent to the predetermined groove, where the optical disk medium is viewed from the radius direction, this state is hereinafter described as "not overlapping each other in the radius direction". In FIG. 2C, the amplitude of the wobble signal in the above-described predetermined area significantly reduces. Subsequently, reading the format information correctly becomes difficult. Where the density of the recording track 3 increases, interference caused by adjacent grooves of the recording track 3 may occur in from thirty to forty percent of the recording track 3.

Where a constant linear velocity (CLV) optical disk medium having a recording track with stable line density is used, the relationship between the positions of address segments in adjacent grooves of the recording track changes successively. Therefore, avoiding the occurrence of the above-described interference becomes difficult.

SUMMARY OF THE INVENTION

Accordingly, it is an object of the present invention to provide an optical disk medium and an optical disk apparatus for reproducing fine format information without generating the above-described problems.

An optical disk medium according to the present invention has a spiral recording track. The recording track is divided into a plurality of address segments with a predetermined address-segment length. A format modulation area is formed at a predetermined position in each of the address segments, so as to overlap the recording track.

According to a first aspect of the present invention, the length of the format modulation area is 25% of the address-segment length or less. The position of the format modulation area in the address segment is selectable two positions of a first modulation area and a second modulation area. The second modulation area is apart from the first modulation area by a distance that is twice as long as the length of the modulation area or more and that is shorter than a distance obtained by subtracting a length twice as long as the length of modulation area from the address-segment length. Format modulation areas in adjacent recording tracks are selected in position so as not to overlap each other in the radius direction of the optical disk medium.

According to a second aspect of the present invention, each of the address segments is divided into a plurality of subunits having a constant subunit length. The format modulation area is formed in the subunit and the length of the format modulation area is 25% of the constant subunit length of the subunit or less. The position of the format modulation area in the subunit is selectable two positions of a first modulation area and a second modulation area. The second modulation area is apart from the first modulation area by a distance that is twice as long as the length of the modulation area or more and that is shorter than a distance obtained by subtracting a length twice as long as the length of the modulation area from the constant subunit length. The format modulation areas in adjacent recording tracks are selected in position so as not to overlap each other in the radius direction of the optical disk medium.

In the first and second aspect of the present invention, it is preferable that the recording track has grooves meandering with substantially constant periodicity provided on parts free of the format modulation areas. A modulation method for the format modulation area is a wobble modulation method that is performed by modulating the meandering of the grooves for the recording tracks.

In the second aspect of the present invention, it is preferable that each of the address segments has a plurality of blank subunits without the format modulation area provided in consecutive manner at the head or end thereof, where the number of the blank subunits is equivalent to a predetermined integer or more, where the integer is obtained by dividing the number of subunits forming the address segment by two (a remainder is omitted). The recording track includes at least one first-type address segment, wherein, in each of the subunits other than the blank subunits, the format modulation area is provided in the first modulation area, and at least one second-type address segment, wherein, in each of the subunits other than the blank subunits, the format modulation area is provided In the second modulation area.

In the second aspect of the present invention, it is also preferable that each of the address segments has a plurality of blank subunits without the format modulation area provided in consecutive manner at the head or end thereof, where the number of the blank subunits is equivalent to a predetermined integer or more, and where the integer is obtained by dividing the number k of subunits forming the address segment by three (a remainder is omitted). The recording track includes at least one first-type address segment, wherein, in each of the subunits other than the blank subunits, the format modulation area is provided in the first modulation area, at least one second-type address segment, wherein, in each of the subunits other than the blank subunits, the format modulation area is provided in the second modulation area, and at least one third-type address segment, wherein consecutive subunits of the subunits other than the blank subunits have the format modulation area in the first modulation area, where the number of the consecutive subunits is equivalent to a predetermined Integer obtained by dividing the subunit number k by three (a remainder is omitted or raise a unit), and wherein the other consecutive subunits have the format modulation area in the second modulation area, where the number of the other consecutive subunits is equivalent to the predetermined integer obtained by dividing the subunit number k by three.

An optical-disk apparatus according to the present invention is for carrying out recording and reproducing to an optical disk medium having format modulation areas selectively provided at two positions at a constant distance in an address segment with a predetermined address-segment length or a plurality of subunits with a constant subunit length. The optical-disk apparatus comprises a first unit for detecting both the format modulation areas at the two positions and a second unit for selecting one of detected outputs according to a detection result obtained by the first unit.

BRIEF DESCRIPTION OF THE DRAWINGS

FIGS. 11A-11C illustrate address-segment configurations according to a sixth embodiment of the present invention, FIGS. 12A and 12B illustrate recording tracks according to a seventh embodiment of the present invention, where the recording track is formed by using the single-placement method, FIGS. 14A and 14B illustrate recording tracks according to an eighth embodiment of the present invention, where the recording track is formed by using the alternate-placement method, FIGS. 15A-15C illustrate address-segment configurations according to a ninth embodiment of the present invention, FIGS. 16A and 16B illustrate recording tracks according to a tenth embodiment of the present invention, where the recording track is formed by using the single-placement method, FIGS. 19A-19C illustrate address-segment configurations according to a thirteenth embodiment of the present invention, FIGS. 20A and 20B illustrate recording tracks according to a fourteenth embodiment of the present invention, where the recording track is formed by using the alternate-placement method, and FIG. 21 schematically illustrates the configuration of an optical disk apparatus according to a fifteenth embodiment of the present invention.

DESCRIPTION OF THE PREFERRED EMBODIMENTS

For solving the above-described problems of the known optical disk medium, modulation areas with format information in adjacent circles of the recording track are provided so as not to overlap each other along the radius direction. In this case, if a reproduction-signal waveform is disturbed by interference between an area having a single-period wobble signal thereon and a modulation area adjacent thereto, the effect of the interference for a reproduction characteristic of this embodiment becomes significantly smaller than that of interference between modulation areas, since this area having the single-period wobble signal is used only for generating a clock signal in synchronization with a wobble-signal waveform.

The principles and preferred embodiments of the present invention will now be described with reference to the attached drawings. According to these principles and preferred embodiments, modulation areas in adjacent recording tracks are prevented from being overlapped each other along the radius direction.

The characteristic of a known CLV optical disk will now be described with reference to FIG. 3. This drawing shows the configuration of an optical disk 14 having a spiral recording track 13 thereon. The grooves of the recording track 13 are provided with substantially constant track interval t therebetween. A solid line, a chain line, and a broken line of this drawing show that the length of the recording track 13 increases for each circle, due to the circular shape of the optical disk 14, as the distance between the recording track 13 and the outer rim of the disk 14 decreases. The right portion of this drawing shows that the length of the recording track 13 changes for each circle, as viewed from a predetermined radius direction.

Figure 1:
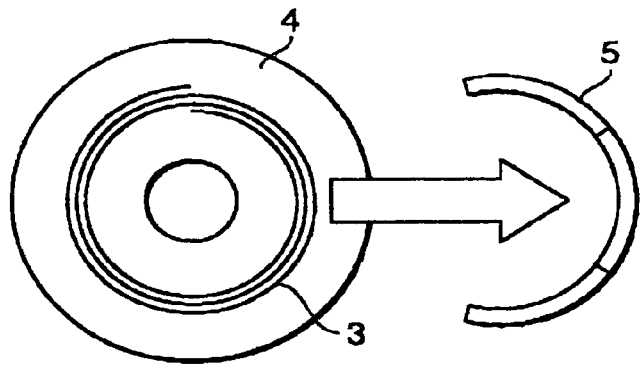
FIG. 1 is a schematic diagram of a known optical disk medium.
Figure 2A:
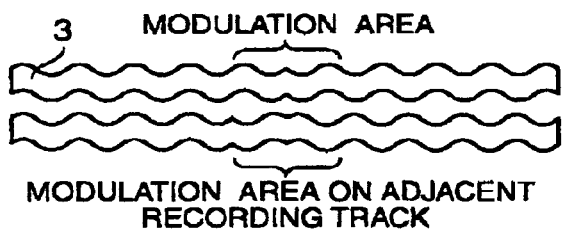
FIG. 2A illustrates two adjacent grooves of a recording track of a known optical disk medium.
Figure 2B:
FIG. 2B illustrates a reproduction signal obtained from the recording track, where no interference occurs.
Figure 2C:
FIG. 2C illustrates a reproduction signal obtained from the recording track, where interference occurs.
Figure 3:
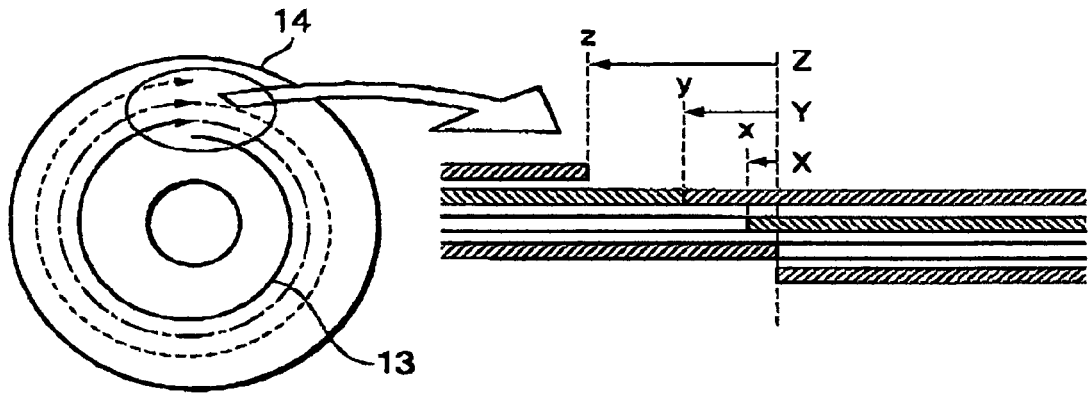
FIG. 3 illustrates a characteristic of a known CLV optical disk.

In FIG. 3, the length of the innermost circle of the recording track 13 is determined to be a reference length. The radius of gyration of a circle adjacent to the innermost circle increases by t with reference to the radius of gyration of the innermost circle. Subsequently, the length of the next circle becomes greater than that of the innermost circle and the position of an end (hereinafter referred to as an end position x) of the next circle is displaced to the left by X ($X = 2\pi t$). Further, an end position of a next circle starting from the end position x is indicated by y. In this case, the end position y is displaced to the left by Y ($Y = X + 4\pi t$). Similarly, an end position of a further next circle starting from the end position y is indicated by z. This end position z is displaced to the left by Z ($Z = Y + 6\pi t$). Thus, the end positions of the circles are displaced to the left, as the distance between the recording track and the outer rim of the disk 14 decreases.

With reference to the end position x, the end position of the inner-side recording track is displaced to the right by $2\pi t$, and the end position y of the outer-side recording track is displaced to the left by $4\pi t$. Further, with reference to the end position y, the end position of the inner-side recording track is displaced to the right by $4\pi t$, and the end position of the outer-side recording track is displaced to the left by $6\pi t$. As the distance between the recording track 13 and the outer rim of the optical disk 14 decreases, the amount of displacement between the end positions of the adjacent recording tracks increases. This relationship between the distance between the recording track 13 and the outer rim of the optical disk 14, and the displacement amount can be generalized. That is to say, if the end position of the inner-side recording track is displaced to the right by $\alpha$, the end position of the outer-side recording track is displaced to the left by ($\alpha + 2\pi t$).

Incidentally, the recording track 13 is divided into a plurality of address segments with a predetermined length. The above-described relationship is the same as those among these address segments. If an end position of a predetermined address segment at the inner radius of the optical disk 14 is displaced to the right by $\alpha$, an end position of a predetermined address segment at the outer radius is displaced to the left by ($\alpha + 2\pi t$).

Where a digital versatile disk (DVD) Is used as the optical disk 14, the track interval t between the adjacent recording track 13 is determined to be 0.74 μm. Where a next-generation high-density recording medium is used as the optical disk 14, the track interval t is determined to be about 0.4 μm. Therefore, the difference between the displacement amount of the end position of the address segment at the inner radius and that of the end position of the address segment at the outer radius, where the difference is indicated by $2\pi t$, is several micrometers. Each of the address segments has a length of about 10 mm. This is because if the length is too short, it is hard to deal with a large amount of address information. Where the length of each of the address segments is about 10 mm and the length is divided into several tens of pieces, the length of each piece becomes several hundreds of micrometers or more. Therefore, a relatively small difference between the displacement amount of the end position of the address segment at the inner radius and that of the end position of the address segment at the outer radius can be ignored. Subsequently, the end position of the address segment at the inner radius can be considered to be displaced to a predetermined direction by a predetermined amount, where the amount is the same as that of the address segment at the outer radius and the displacement direction is opposite thereto.

The principles of the present invention will now be described with reference to FIGS. 4A to 4E.

Figure 4A:
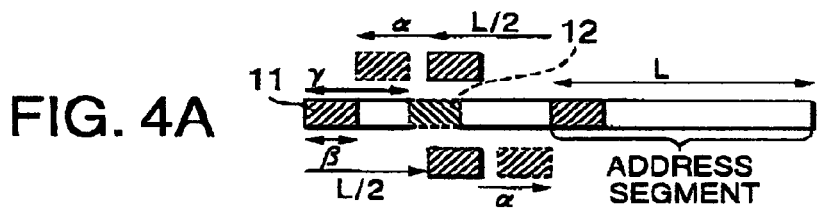
FIGS. 4A-4E are enlarged views of a part of a magnetic track for explaining the principle of the present invention.

FIG. 4A shows an address-segment configuration according to the present invention and the relationship between format-modulation areas adjacent to each other. A first modulation area 11 is provided at the head of each of the address segments and a second modulation area 12 is provided at distance γ from the head.

First, it is assumed that the modulation area 11 is selected. An address segment that is adjacent to the address segment of the modulation area 11 and that is in along the radius of the optical disk 14 with reference to the address segment of the modulation area 11 is displaced by $+L/2$. Further, an address segment that is adjacent to the address segment of the modulation area 11 and that is out along the radius of the optical disk 14 with reference to the address segment of the modulation area 11 is displaced by $-L/2$. According to the above-described configuration, a modulation area of the address segment that is in along the radius is displaced to the right by $\alpha$. Further, a modulation area of the address segment that is out along the radius is displaced to the left by $\alpha$. This configuration can be easily confirmed by tracing all the address segments from the inner-side address segment to the outer-side address segment. Where the length of each modulation area is indicated by $\beta$, then $\alpha + \beta = L/2$. Under these conditions, adjacent modulation areas overlap each other along the radius direction. At this time, a clearance is created near the second modulation area 12, where the second modulation area 12 is between the two adjacent modulation areas. That is to say, this clearance is kept free of the adjacent modulation areas shown as $2\alpha - \beta$. Therefore, if the length of this clearance is $\beta$, the modulation area in the address segment can be changed from the first modulation area 11 to the second modulation area 12. Further, if the modulation areas of the address segments of the adjacent recording tracks are displaced to the right and left, the modulation areas are prevented from being overlapped each other along the radius direction.

Therefore, $\beta$ satisfying the following expressions (1) and (2) can be obtained by expression (3).

$$\alpha + \beta = L/2 \tag{1}$$

$$2\alpha - \beta > \beta \tag{2}$$

$$L/4 > \beta \tag{3}$$

Subsequently, if the modulation-area length $\beta$ is smaller than 25% of the address-segment length L, a clearance that does not overlap the adjacent modulation areas along the radius direction exists in either the first modulation area 11 or the second modulation area 12.

The position γ of the second modulation area 12 should be determined to be a predetermined point in a clearance generated after the adjacent modulation areas are displaced to the right and left by α. Therefore, γ should satisfy expression (6) led by expressions (4) and (5).

$$\gamma > \beta + \beta \quad (4)$$

$$\gamma + \beta < L - \beta \quad (5)$$

$$2\beta < \gamma < L - 2\beta \quad (6)$$

If $\beta = L/4$, then $\gamma = L/2$. Subsequently, the position of the second modulation area 12 is determined to be a point at the middle of the address-segment length.

Under limit conditions shown as $\beta = L/4$ and $\gamma = L/2$, the relationship between the positions of the adjacent address segments and how the modulation-area selection changes will be described with reference to the attached drawings. Hereinafter, the amount of a displacement to the right at the outer radius is indicated by a number with a minus sign. Further, the amount of a displacement to the left at the outer radius is indicated by a number with a positive sign. The relative position relationship between the adjacent address segments changes, as the displacement amount changes from 0 to L. Since this relative position relationship has periodicity (L of the displacement amount), an examination of only one circle, for example, from 0 to L, -L/2 to L/2, and so forth, provides an understanding of all possible positions of the adjacent address segments.

Figure 4B:
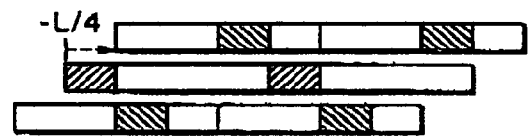
Figure 4C:

FIG. 4B shows a case where the displacement amount is -L/4. According to these positions, between the adjacent address segments, the first modulation area and the second modulation area appear alternately. FIG. 4C shows a case where the displacement amount is L/4. Thus, where the displacement amount changes from -L/4 to L4, the first modulation area and the second modulation area appear alternately in the adjacent address segments between the adjacent recording tracks.

Figure 4D:
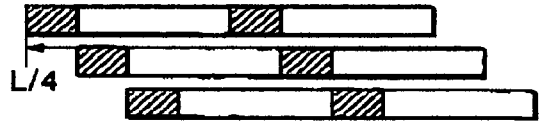
Figure 4E:

After the displacement amount changes from L/4, only the first modulation area appears in each of the address segments, as shown in FIG. 4D. Where the displacement amount changes from L/4 to 3L/4, these first modulation areas exist, as shown in FIG. 4E. At this point, the above-described period switches to a new period from 3L/4 to -L/4. The positions of the address segments changes to the positions shown in FIG. 4B. Thus, over the displacement-amount period, the modulation areas of the address segments on the adjacent recording tracks can be provided so as not to overlap one another along the radius direction. Over the period from FIGS. 4D to 4E, only the second modulation area may be used in each of the address segments on the adjacent circles.

FIGS. 5A to 5E show the positions of address segments on adjacent recording tracks according to a first embodiment of the present invention. These drawings show how the address-segment configuration of the optical disk changes. Each of FIGS. 5A to 5E shows part of the recording track. The part shown in FIG. 5A corresponds to the inner radius of the optical disk and the part shown in FIG. 5E corresponds to the outer radius of the optical disk. That is to say, the parts are shown in sequence, from the inner radius to the outer radius, in an upward direction. Each of these drawings mainly shows the parts where the positions of the modulation areas change in each circle.

Figure 5E:
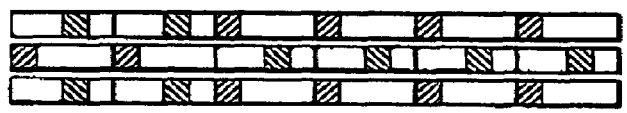
FIGS. 5A-5E illustrate recording-track configurations according to a first embodiment of the present invention.
Figure 5D:
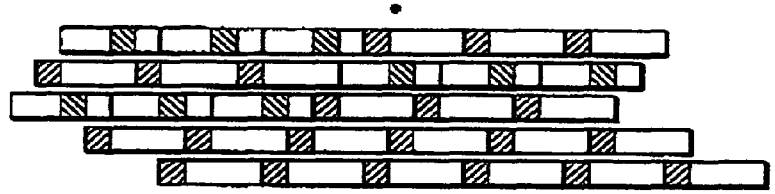
Figure 5C:
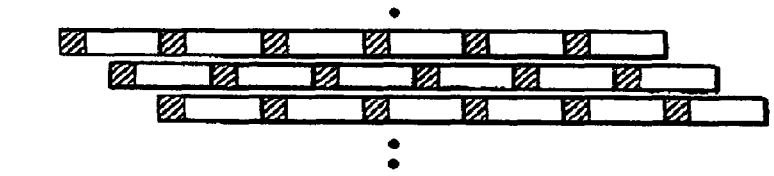
Figure 5B:
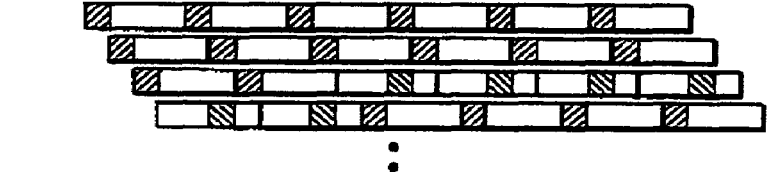
Figure 5A:
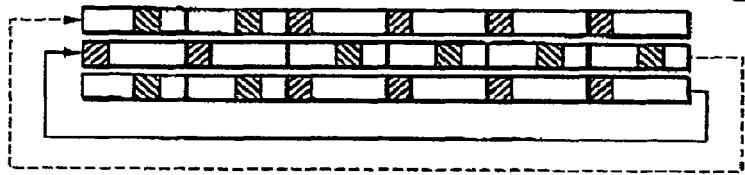

FIG. 5A shows a predetermined part in one circle, where the number of the address segments becomes an integer. The displacement amount between the adjacent address segments is zero. Further, an address segment with a first modulation area appears In one of adjacent circles and an address segment with a second modulation area appears in the other. That is to say, the first modulation area and the second modulation area appear in alternating manner in the adjacent circles. Further, since the recording track is formed in a spiral fashion, these circles are connected to one another, as shown by a solid line and a broken line shown in this drawing. Therefore, the point between the second and third address segments from the left is determined to be a border. At this point, the type of modulation areas used in the address segments circling the optical disk changes.

FIG. 5B shows a case where the displacement amount is L/4. The point between the second and third address segments from the left of the second row from underneath is determined to be a border At this point, the type of modulation areas used in the address segments is changed from the second to the first.

FIG. 5C shows a case where the displacement amount approaches L/2. In this drawing, only the first modulation areas are used in the address segments.

FIG. 5D shows a case where the displacement amount is 3L/4. A border is provided in the middle of the third row from underneath. From this point, the first modulation areas and the second modulation areas appear in alternating manner.

FIG. 5E shows a case where the displacement amount Is L and where the positions of the address segments become the same as in the case where the displacement amount is 0. The above-described change in the address-segment positions is repeated with periodicity toward the outer radius of the optical disk.

As has been described, where the amount of displacement between the address segments of the adjacent recording tracks is about zero, the address segments are provided so that two types of modulation areas exist in alternating manner. This configuration is hereinafter referred to as alternate placement. On the other hand, where the amount of displacement between the adjacent address segments is about one-half of the address-segment length, only one type of modulation areas exist in the address segments. This configuration is hereinafter referred to as single placement. According to these configurations, an optical disk is achieved, wherein format modulation areas of address segments of adjacent recording tracks do not overlap one another along the radius direction.

The embodiments shown in FIGS. 4A to 4E and FIGS. 5A to 5E are given under the limit conditions. That is to say, the length β of the modulation area is L/4. Therefore, the type of placement is changed when the displacement amount becomes L/4 or 3L/4. However, where the length β is smaller than L/4, both the alternate placement and the single placement can be selected at a point near a border where the type of placement changes. In this case, small errors in placement of the address segments can be ignored. Subsequently, an optical disk can be manufactured with a sufficient margin.

Where the modulation-area length β is smaller than L/4 and the distance γ between the first modulation area and the second modulation area is not L/2, the alternate placement is carried out from a point where the displacement amount is -β to a point where the displacement amount is β, and the single placement is carried out from a point where the displacement amount is β to a point where the displacement amount is L-β. As a result, an optical disk is achieved, wherein format modulation areas of address segments of adjacent recording tracks do not overlap one another along the radius direction.

According to the above-described embodiment, each of the first modulation areas is provided at the head of the address segment. However, if the interval between the two types of modulation areas satisfies the above-described expression (6), the first modulation area may be provided at any place in the address segment.

Figure 6:
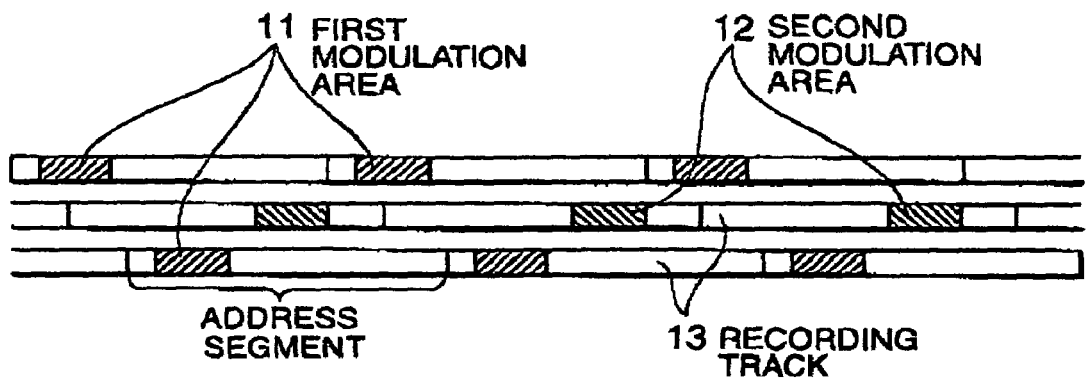
FIG. 6 illustrates a recording-track configuration according to a second embodiment of the present invention.

A second embodiment of the present invention will now be described with reference to FIG. 6. This drawing shows an example recording track 13. In this recording track 13, the first modulation area 11 is not provided at the head of each of the address segments. In one of the grooves of the recording track 13, which is shown at the middle, a format modulation area is provided in the second modulation area 12, whereby the alternate placement is achieved. On each of the circles of the recording track 13, modulation areas of the same type are provided with a periodicity same as that of the address segments. According to this configuration, a border can be provided at any point between the address segments, whereby the relationship between the positions of modulation areas of the adjacent circles becomes the same as that of the first embodiment. However, at the end of each circle, the point where the type of the address segments changes from one to the other exists, as shown in FIG. 5A. Therefore, the border cannot be provided in the modulation areas.

According to the above-described embodiments, the format modulation area is provided at only one place in each of the address segments. However, the address segment can be divided into a plurality of subunits having predetermined length L'. In this case, an address modulation area can be provided in each of the subunits. That is to say, the address modulation area can be spread out. If the length of one of the modulation areas becomes too long, the probability of occurrence of errors of format-information detection relative to burst errors or the like increases. Therefore, the address modulation areas may preferably be spread out in several places. In this case, a first modulation area and a second modulation area are provided in each of the subunits and the position of a format modulation area is selected between these two modulation areas. The selection is performed under the above-described conditions although the subunit length L' is used in place of the address-segment length L.

Figure 7:
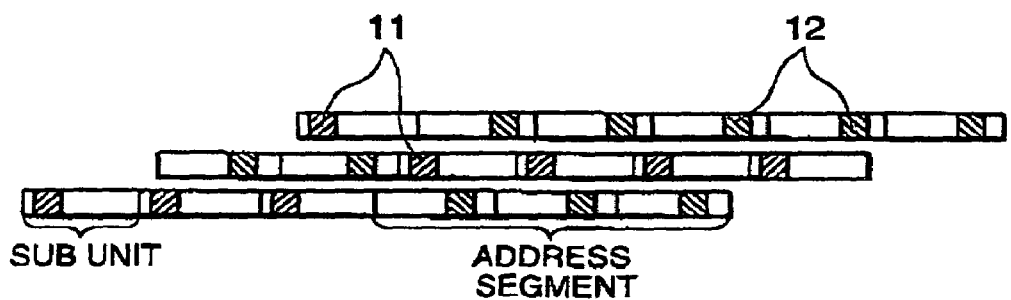
FIG. 7 illustrates a recording-track configuration according to a third embodiment of the present invention.

FIG. 7 illustrates a third embodiment of the present invention. In this embodiment, each of the address segments is divided into three subunits and the alternate placement is performed. The first modulation area 11 and the second modulation area 12 are provided in the subunits. Accordingly, an optical disk is achieved, wherein format modulation areas of address segments of adjacent recording tracks do not overlap one another along the radius direction.

The lengths of the modulation areas of the subunits in each of the address segments are not necessarily be the same as one another, but are limited to be 25% of the subunit length L' or less. In relation to the position of either the first modulation area or the second modulation area, where the position is determined by one of the subunits and where the subunit has the longest modulation area, the modulation areas of the other subunits, where the modulation areas are shorter than the above-described modulation area, must be determined so as not to deviate from positions corresponding to the position of the longest modulation area. That is to say, the position of either the first modulation area or the second modulation area is determined according to the subunit with the longest modulation area. Then, as for the subunits with the shorter modulation areas, the modulation areas are determined so as not to deviate from positions corresponding to the position of the longest modulation area. Subsequently, if a predetermined subunit of a predetermined address segment on a predetermined circle becomes adjacent to any subunit, the modulation areas of the adjacent subunits do not overlap each other along the radius direction.

Where a single address segment is divided into a plurality of subunits, the following possibilities arise. For example, where a format modulation area is detected through an optical disk apparatus, two types of subunits may exist in a single address segment. That is to say, a subunit having a format modulation area In the first modulation area and a subunit having a format modulation area in the second modulation area may exist in the single address segment.

According to this embodiment, two second modulation areas and one first modulation area are provided in three subunits of a leftmost address segment in a groove in the middle, as shown in FIG. 7. Similarly, one first modulation area and two second modulation areas are provided in three subunits of a leftmost address segment in a groove at the top. Therefore, a format modulation area may appear in both the leftmost address segment in the middle groove and the leftmost address segment in the top groove at the detection time.

If the lengths of modulation areas of all the subunits do not reach about 25% of the subunit length, address segments are provided in the following manner, so that the two types of subunits can co-reside in one address segments within a predetermined limitation.

First, at least one blank subunit without a format modulation area is provided in each of the address segment. Subsequently, either the first modulation area or the second modulation area can be provided in subunits on both sides of the blank subunit, whereby the address-segment configuration can be limited.

A first method for achieving the above-described configuration will now be described. If the amount of format information of the address segment is small, one-half the subunits or more is formed as consecutive blank subunits. If the number of the subunits, where the number is indicated by k, cannot be divided by two, the number is divided by 2 and the remainder is discarded and the quotient becomes an integer. This integer corresponds to the number of the black subunits. Where the above-described blank subunits are provided, only two types of address segments including a first-type address segment and a second-type address segment can form the recording track. According to this configuration, a plurality of the first modulation areas is provided in subunits of the first-type address segment and a plurality of the second modulation areas is provided in subunits of the second-type address segments.

Figure 8A:
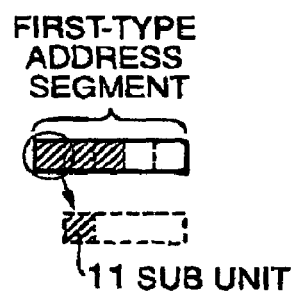
FIGS. 8A and 8B illustrate address-segment configurations according to a fourth embodiment of the present invention.
Figure 8B:
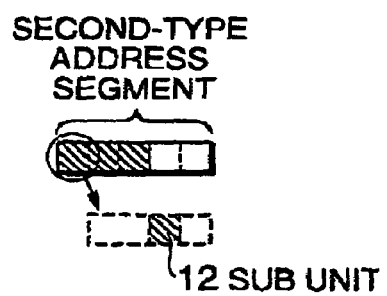

FIGS. 8A and 8B illustrate an address-segment configuration according to a fourth embodiment of the present invention. The above-described first method is used in this embodiment. These drawings illustrate the case where the number of subunits in each of address segments is five. In this case, the two into five goes two times with a remainder of one. Therefore, the number of the blank subunits becomes 2 or more. FIG. 8A shows the first-type address segment including three subunits with the first modulation area 11 and two blank subunits. FIG. 8B shows the second-type address segment including three subunits including the second modulation area 12 and two blank subunits.

The configuration of a recording track including only two types of address segments will now be described. As shown in FIGS. 4A to 4E, the address segments on the adjacent recording tracks can be provided according to two methods including the alternate placement and the single placement. In the case of the alternate placement, the amount of displacement is zero in relation to the subunit length L'. In the case of the single placement, the amount of displacement is about L'/2. If the subunit configuration in each of the address segments is limited, the type of placement may change, according to the displacement amount in relation to the number of subunits included in the address segment. For example, when the number of the subunits is five and the displacement amount is from 0, L', 2L', 3L', to 4L', the alternate placement is used. However, if the displacement amount is from L'/2, 3L'/2, 5L'/2, 7L'/2, to 9L'/2, the single placement is used.

Where the single placement is used, each of the address segments may include subunits of the same type.

Figure 9A:
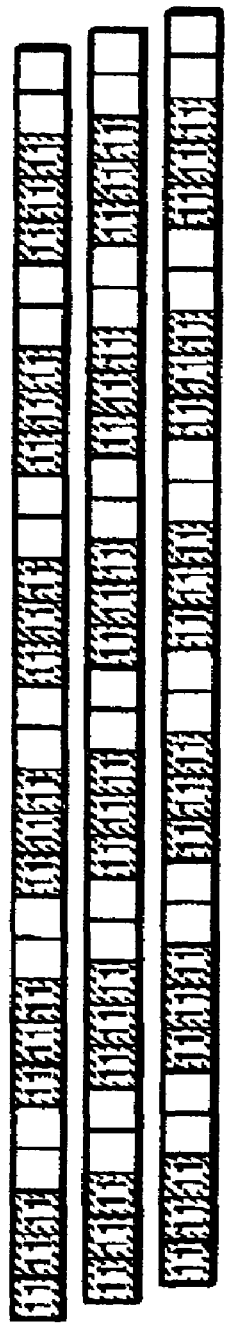
FIGS. 9A and 9B illustrate recording tracks according to a fifth embodiment of the present invention, where the recording track is formed by using a single-placement method.
Figure 9B:
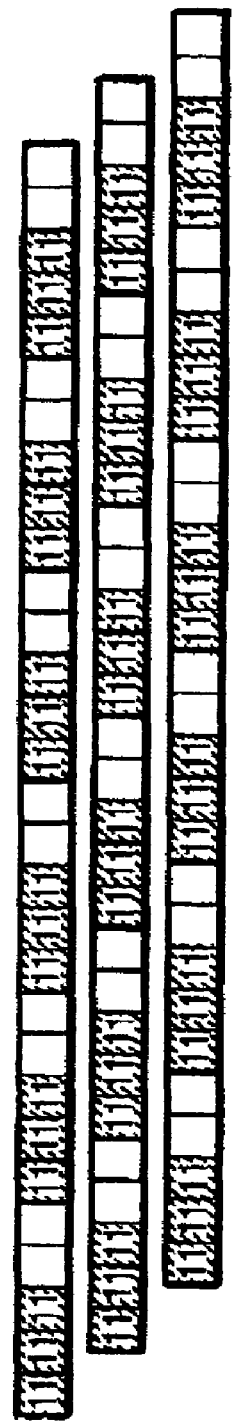

A fifth embodiment of the present invention will now be described with reference to FIGS. 9A and 9B. Each of these drawings illustrates a recording track formed by using the single-placement method. FIG. 9A shows a case where the displacement amount is L'/2 and FIG. 9B shows a case where the displacement amount is 3L'/2. In either case, the recording track can be formed by using only a plurality of the first-type address segments. Of course, the recording track may be formed by using only a plurality of the second-type address segments, as in the above-described embodiment.

The other displacement-amount conditions of the single placement are the same as those of the above-described embodiment.

Where a recording track is formed by using the alternate-placement method, first-type address segments and second-type address segments are provided so that these two types of address segments appear in alternate manner in adjacent circles in most part of the recording track. However, the address-segment configuration must be changed, at a point where the type of the address segments changes, from the first type to the second type or vice versa along the direction in which the recording track extends. If this change is achieved, format modulation areas along the entire length of the recording track can be provided so as not to overlap one another in the radius direction.

Figure 10A:
FIGS. 10A-10E illustrate recording tracks according to the fifth embodiment of the present invention, where the recording track is formed by using an alternate-placement method.
Figure 10B:
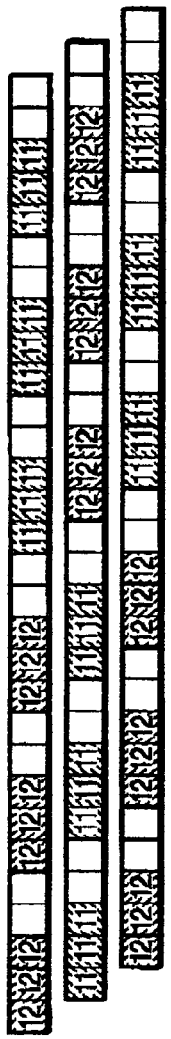
Figure 10C:
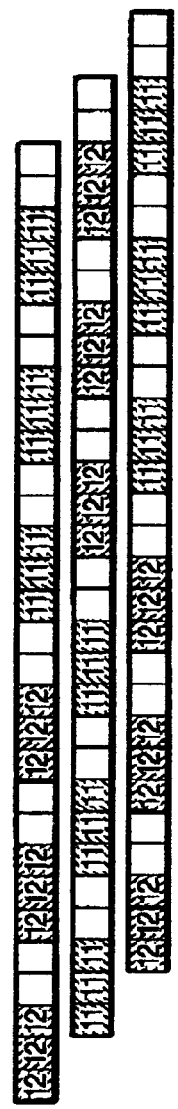
Figure 10D:
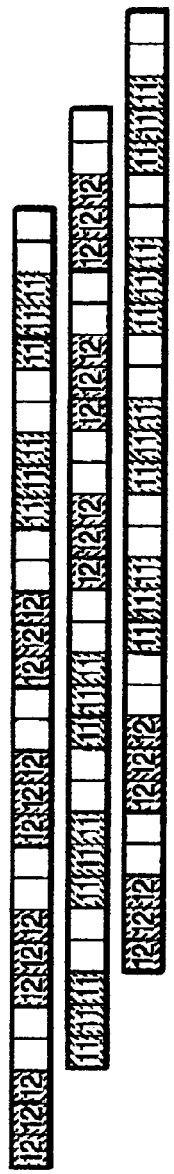
Figure 10E:
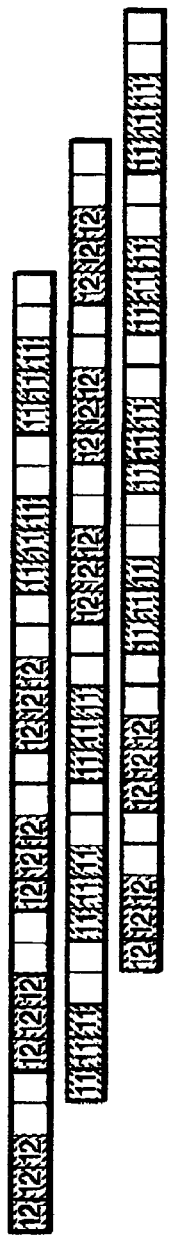

FIGS. 10A to 10E illustrate another recording track according to this embodiment, where the recording track is formed by using the alternate-placement method. FIG. 10A illustrates a case where the displacement amount is zero, FIG. 10B illustrates a case where the displacement amount is L', FIG. 10C illustrates a case where the displacement amount is 2L', FIG. 10D illustrates a case where the displacement amount is 3L', and FIG. 10E illustrates a case where the displacement amount is 4L'. Each of the drawings shows a part where the address-segment configuration along the recording-track direction changes. In each case, modulation areas of the same type in adjacent recording tracks do not overlap one another in the radius direction, since blank subunits are provided in each of the address segments.

If the number of consecutive subunits with modulation areas is less than i+1, in relation to the number of consecutive blank subunits, where the number is indicated by i, and if subunits with the first-type modulation areas and subunits with the second-type modulation areas are provided on both sides of the consecutive blank subunits, the consecutive subunits with the modulation areas in a single address segment do not overlap consecutive subunits with modulation areas adjacent thereto along the radius direction. This configuration can be easily understood by referring to a border between the third and fourth address segments from the left shown in FIG. 10C.

The above-described configuration can be achieved by providing the consecutive blank subunits at the head of an address segment.

If the number of blank subunits is smaller than that of the above-described case where the first method is used, a second method can be used. According to this second method, the number of blank subunits, where the number is indicated by k, is divided by three. The remainder is discarded, if generated. The result number becomes an integer that corresponds to the number of the blank subunits. This blank-subunit number may be larger than the result number. In this case, where the subunit number is five, the tree into five goes one time with a reminder of 2. Therefore, the blank-subunit number becomes 1.

According to the second method, three types of address segments are used for forming the recording track, as shown in FIGS. 11A to 11C.

These drawings illustrate an address-segment configuration according to a sixth embodiment of the present invention. FIG. 11A illustrates the first-type address segment with one blank subunit and four subunits with first modulation areas, and FIG. 11B illustrates a second-type address segment with one blank subunit and four subunits with second modulation areas. FIG. 11C illustrates a third-type address segment with one blank subunit, two subunits with first modulation areas, and two subunits with second modulation areas.

According to the configuration of the third-type address segment, the number of the consecutive subunits with the first modulation areas and that of the consecutive subunits with the second modulation areas satisfy k/3. If the subunit number k cannot be divided by three, the result number is rounded up or down. Subsequently, an integer, that is, one or two is obtained. Since the sum of the number of the consecutive subunits with the first modulation areas and that of the consecutive subunits with the second modulation areas must be the total number of subunits other than the blank subunits, each of the number of the first modulation areas and that of the second modulation areas becomes two.

According to this second method, the single placement can easily be performed, as in the case of the first method. FIGS. 12A and 12B illustrate example single placement performed for a recording track according to a seventh embodiment of the present invention. FIG. 12A shows a case where the displacement amount is L'/2 and FIG. 12B shows a case where the displacement amount is 3L'/2. In either case, the recording track can be formed by using a plurality of the first-type address segments. Of course, the recording track can be formed by using a plurality of the second-type address segments, as in the above-described embodiment. The other displacement-amount conditions of the single placement are the same as those of the above-described embodiment.

Figure 13A:
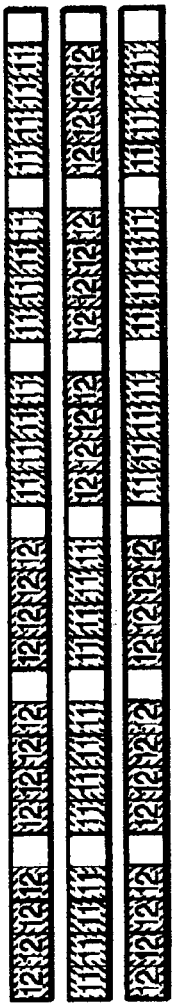
FIGS. 13A-13E illustrate recording tracks according to the seventh embodiment of the present invention, where the recording track is formed by using the alternate-placement method.
Figure 13B:
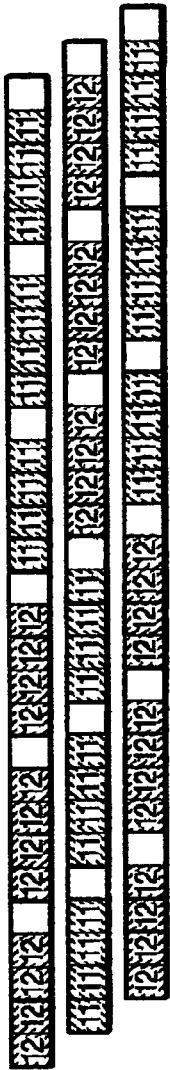
Figure 13C:
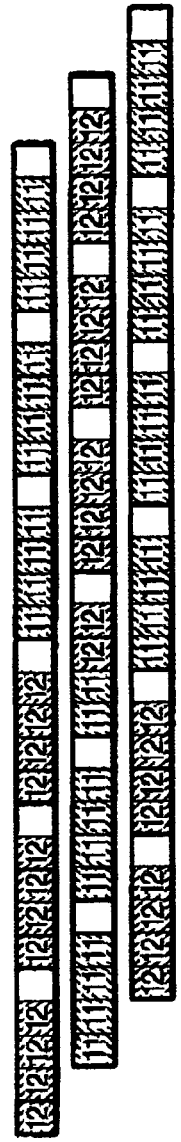
Figure 13D:
Figure 13E:

If the alternate placement is performed, the configuration of part of the recording track, where the type of address segments changes, becomes complicated. FIGS. 13A to 13E illustrate an example recording track according to this embodiment, where the recording track is formed by using the alternate-placement method. FIG. 13A shows a case where the displacement amount is zero, and FIG. 13B shows a case where the displacement amount is L'. FIG. 13C shows a case where the displacement amount is 2L', and FIG. 13D shows a case where the displacement amount is 3L'. FIG. 13E shows a case where the displacement amount is 4L'. Each of the drawings shows the moment where the address-segment configuration changes along the recording-track direction. Since the number of blank subunits is limited, when the displacement amount is 2L', as shown in FIG. 13C, and when the displacement amount is 3L', as shown in FIG. 13D, second modulation areas are provided on both sides of a blank subunit. That is to say, a third-type address segment is required in addition to the first-type and second-type address segments. Therefore, as shown in each of FIGS. 13C and 13D, the third-type address segment is used for the third address segment from the left on the middle groove of the recording track. Subsequently, modulation areas of the same type on adjacent recording tracks, where the modulation areas are provided along the direction in which the recording track extends, do not overlap one another along the radius direction. According to this configuration, one third-type address segment is used for every two circles. Therefore, most part of the recording track can be formed by using the first-type address segments and second-type address segments, where the first-type address segments and the second-type address segments are provided according to the alternate-placement method.

In this embodiment, the first modulation areas are provided in subunits corresponding to the first half of the third-type address segment. However, the second modulation area may be provided in subunits corresponding to the first half of the third-type address segment. In this case, the third-type address segment is provided at a part where the type of the address segments changes from second to first. Further, the blank subunit may be provided at the head of the third-type address segment, as in the fifth embodiment.

Further, in the case where the displacement amount is 2L' or 3L', only the third-type address segments can be used.

FIGS. 14A to 14B illustrate an example recording track according to an eighth embodiment of the present invention, where the recording track is formed by using the alternate-placement method. FIG. 14A illustrates a case where the displacement amount is 2L', FIG. 14B illustrates a case where the displacement amount is 3L'. According to this configuration, the recording track can be formed by using only one type of address segments, which has an advantage over the configuration of the above-described recording track, which uses three types of address segments provided according to the alternate-placement method. In these drawings, first modulation areas are provided in the first half of each of the third-type address segments. However, second modulation areas may be provided in the first half thereof.

As is clear from the above-described configuration, a predetermined configuration can be achieved, as long as the number of consecutive subunits with modulation areas of the same type is i+1 or less, in relation to the blank-subunit number i. This limitation is the same as that of Claim 6.

FIGS. 15A to 15C illustrate an example address-segment configuration according to a ninth embodiment of the present invention. In this embodiment, address segments are provided according to the above-described second method. The number of subunits used in each of the address segments is four (k=4). In this case, three into four goes into one time with a remainder of one. Therefore, the blank-subunit number becomes one. FIG. 15A shows a first-type address segment including one blank subunit and three subunits with modulation areas of the same type, as in the above-described embodiment. FIG. 15B shows a second-type address segment including one blank subunit and three subunits with modulation areas of the same type, as in the above-described embodiment. FIG. 15C shows a third-type address segment including one blank subunit and two types of subunits. In this case, the third-type address segment has two subunits with first modulation areas and one subunit with a second modulation area. In the case of FIG. 15C, k/3 is one or two. However, the number of subunits of this third-type address segment other than the blank subunit thereof is three. Therefore, two modulation areas of one type and one modulation area of another type are provided in the third-type address segment.

FIGS. 16A and 16B illustrate an example recording track according to a tenth embodiment of the present invention, where the recording track is formed by using the single-placement method. FIG. 16A shows a case where the displacement amount is L'/2 and FIG. 16B shows a case where the displacement amount is 3L'/2. In either case, the recording track can be formed by using a plurality of the first-type address segments.

Figure 17A:
FIGS. 17A-17D illustrate recording tracks according to an eleventh embodiment of the present invention, where the recording track is formed by using the alternate-placement method.
Figure 17B:
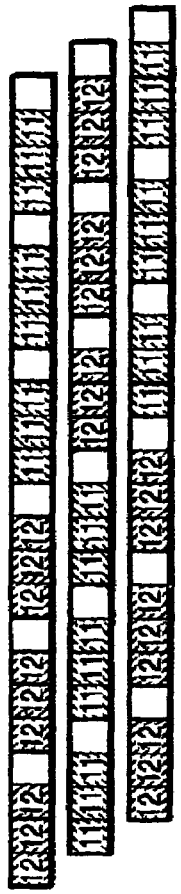
Figure 17C:
Figure 17D:
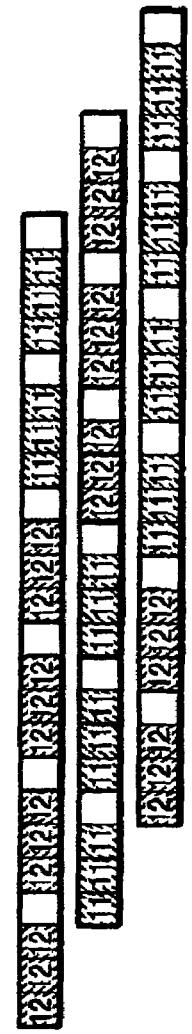

FIGS. 17A to 17D illustrate an example recording track according to an eleventh embodiment of the present invention, where the recording track is formed by using the alternate-placement method. FIG. 17A shows a case where the displacement amount is zero, FIG. 17B shows a case where the displacement amount is L'. FIG. 17C shows a case where the displacement amount is 2L', and FIG. 17D shows a case where the displacement amount is 3L'. Each of the drawings shows a part where the type of the address segments changes along the recording-track direction. Where the displacement amount is 2L', as shown in FIG. 17C, a third-type address segment is provided as the third address segment from the left in the middle groove of the recording track. Subsequently, modulation areas of the same type on adjacent recording tracks, where the modulation areas are provided along the direction in which the recording track extends, do not overlap one another along the radius direction. In the case of this drawing, where the displacement amount is 2L', the recording track can be formed by using only a plurality of the third-type address segments, as in the above-described embodiment.

Figure 18A:
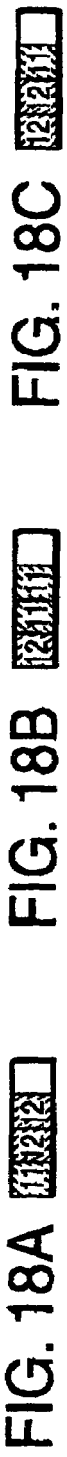
FIGS. 18A-18C illustrate address-segment configurations according to a twelfth embodiment of the present invention.
Figure 18B:
Figure 18C:

FIGS. 18A to 18C illustrate an example address-segment configuration according to a twelfth embodiment of the present invention. In this embodiment, three types of third-type address segments different from those of the above-described embodiments can be used.

In the above-described embodiments, the number of the subunits included in the address segments is relatively small. However, the use of an increased number of subunits does not affect the principles of the present invention. That is to say, a recording track can be formed according to the above-described methods by using limited types of address segments. Where the number of subunits increases and where the above-described methods are not used, the number of combinations of modulation areas of different types may increase. In this case, address segments including the modulation areas of different types also need to be detected. Therefore, the use of the above-described methods is effective.

FIGS. 19A to 19C illustrate an example address-segment configuration according to a thirteenth embodiment of the present invention. Address segments are provided according to the above-described second method and each of the address segments includes seventeen subunits. As for the number of subunits used In each of the address segments, three into seventeen goes five times with a remainder of two. Therefore, the blank-subunit number is determined to be five or more. FIG. 19A shows a first-type address segment including five blank subunits and twelve subunits with modulation areas of the same type. FIG. 19B shows a second-type address segment including five blank subunits and twelve subunits with modulation areas of the same type. FIG. 19C shows a third-type address segment having two types of consecutive subunits with modulation areas of the same type. The number of the consecutive subunits with modulation areas of the same type becomes five or six. Further, the number of subunits other than the blank subunits is twelve. Therefore, the number of each of the two types of consecutive subunits is determined to be six.

Where the amount of displacement between address segments in adjacent recording tracks is 6L', 7L', 8L', 9L', 10L', and 11L', a predetermined number of the third-type address segments are used. FIGS. 20A and 20B illustrate an example recording track according to a fourteenth embodiment of the present invention, where the recording track is formed by using the alternate-placement method. FIG. 20A illustrates a part of the recording track where the type of address-segment configuration changes. In this drawing, the displacement amount is 6L'. Since the third-type address segment is used in the middle groove of the recording track, modulation areas of the same type in adjacent recording tracks do not overlap one another in the radius direction. FIG. 20B illustrates an example recording track formed by using only a plurality of the third-type address segments. The displacement amount is also 6L'. In either case, the alternate placement can be achieved without problems.

As has been described, the use of the above-described methods of the present invention reduces the coexistence of the first modulation areas and the second modulation areas in a single address segment. Subsequently, the reliability of format-modulation-area detection increases.

Usually, a special pattern is used for a format modulation area at the head of an address segment. This special pattern is different from the patterns of other modulation areas of format information such as address data, so as to identify a border between address segments. For example, in the other modulation are as, modulation is performed by using two wobble periods as a unit. However, in the format modulation area at the head of the address segment, modulation is performed by using three periods as a unit.

However, according to the present invention, the position of a modulation area can be selected between two potential positions. Therefore, when the format modulation area with the special pattern is detected, locating the head of the address segment without determining the position of the modulation area becomes difficult.

An identification signal can be added to each of the format modulation areas, so as to know which position is selected for each of the format modulation areas. In this case, however, the amount of information added to the format modulation areas increases in accordance with the number of divided subunits. Therefore, predetermined information is stored in somewhere within the format modulation area. This information indicates that at which position the head special pattern exists. When this information is detected, the border between the address segments is determined.

Where the first modulation area and the second modulation area co-reside in a single address segment, the above-described information may preferably be stored at a position as close to the head of the address segment as possible. If possible, two types of special patterns may be used.

According to the present invention, the address-segment configuration can be limited by using the above-described blank subunits. In this case, subunits are provided consecutively from the head of an address segment in the same manner as those of other address segments. Therefore, if the above-described information is stored in the subunits, the format-modulation-area detection can be performed at almost regular intervals corresponding to special pattern-to-subunit periods. Subsequently, the problems of format-modulation-area detection can be solved.

Further, for achieving reliability of format-modulation-area detection, if the number of subunit-configuration types is limited to be two or three, the type of an address segment may be provided. Of course, the type of this address segment may be provided. However, where the recording track is followed, the type of the pattern of an address segment that is to be detected next may be provided.

A wobble-phase modulation method, a frequency modulation method, a method of modulating the width of a groove, a method of shifting a groove sharply to the radius direction, and so forth, can be used as a recording method of the format modulation area. Further, where the groove of the recording track has a periodic structure and where format information is stored in prepits, the present invention can be used.

FIG. 21 illustrates an example optical-disk apparatus according to a fifteenth embodiment of the present invention. The optical disk 14 is mounted on a spindle 20. Recording and reproduction of data is performed by an optical head 21. Where the wobble modulation method is used, a wobble-synchronous-clock generation circuit 22 generates a timing synchronous signal through a wobble-reproduction signal. Further, a format detection circuit 23 detects format information stored in the format modulation area. At this time, both a first modulation area and a second modulation area can be detected. When the information stored in the format modulation area is reproduced, a wobble synchronous clock is often disturbed by a modulation signal. Therefore, the wobble synchronous clock may be controlled by masking an input to the wobble-synchronous-clock generation circuit 23 over the time period during the wobble synchronous clock is disturbed. Further, where the pattern of subunits in an address segment is limited, a pattern determination circuit 24 determines the pattern of the subunits. Then, according to the determination result, the pattern determination circuit 24 selects one of possible patterns. Subsequently, the reliability of format-information detection increases.

As has been described, the optical disk medium and the optical disk apparatus according to the present invention allow for reducing interference from adjacent recording tracks and detecting format information with reliability.

What is claimed is:

1. An optical disk medium having a spiral recording track, the recording track being divided into a plurality of address segments with a predetermined address-segment length, a format modulation area being formed at a predetermined position in each of a part of the address segments, so as to overlap the recording track,
wherein the length of the format modulation area is 25% of the address-segment length or less,
the position of the format modulation area in the address segment being selectable two positions of a first modulation area and a second modulation area, the second modulation area being apart from the first modulation area by a distance that is twice as long as the length of the modulation area or more and that is shorter than a distance obtained by subtracting a length twice as long as the length of the modulation area from the address-segment length,
the format modulation areas in adjacent recording tracks being selected in position so as not to overlap each other in the radius direction of the optical disk medium.

2. An optical disk medium according to claim 1, wherein the recording track has grooves meandering with substantially constant periodicity provided on parts free of the format modulation areas and a modulation method for the format modulation area is a wobble modulation method that is performed by modulating the meandering of the grooves for the recording tracks.

3. An optical disk medium having a spiral recording track, the recording track being divided into a plurality of address segments with a predetermined address-segment length, a format modulation area being formed at a predetermined position in each of a part of the address segments, so as to overlap the recording track,
wherein each of the address segments is divided into a plurality of subunits having a constant subunit length,
wherein the format modulation area being formed in the subunit and the length of the format modulation area being 25% of the constant subunit length of the subunit or less, the position of the format modulation area in the subunit being selectable two positions of a first modulation area and a second modulation area, the second modulation area being apart from the first modulation area by a distance that is twice as long as the length of the modulation area or more and that is shorter than a distance obtained by subtracting a length twice as long as the length of the modulation area from the subunit length, the format modulation areas in adjacent recording tracks being selected in position so as not to overlap each other in the radius direction of the optical disk medium, wherein each of the address segments includes a plurality of blank subunits without the format modulation area provided in consecutive manner at the head or end thereof, where the number of the blank subunits is equivalent to a predetermined integer or more, where the integer is obtained by dividing the number of subunits forming the address segment by two and a remainder thereof is omitted, the recording track including:

at least one first-type address segment, wherein, in each of the subunits other than the blank subunits, the format modulation area is provided in the first modulation area; and at least one second-type address segment, wherein, in each of the subunits other than the blank subunits, the format modulation area is provided in the second modulation area.

4. An optical disk medium having a spiral recording track, the recording track being divided into a plurality of address segments with a predetermined address-segment length, a format modulation area being formed at a predetermined position in each of a part of the address segments, so as to overlap the recording track, wherein each of the address segments is divided into a plurality of subunits having a constant subunit length, wherein the format modulation area being formed in the subunit and the length of the format modulation area being 25% of the constant subunit length of the subunit or less, the position of the format modulation area in the subunit being selectable two positions of a first modulation area and a second modulation area, the second modulation area being apart from the first modulation area by a distance that is twice as long as the length of the modulation area or more and that is shorter than a distance obtained by subtracting a length twice as long as the length of the modulation area from the subunit length, the format modulation areas in adjacent recording tracks being selected in position so as not to overlap each other in the radius direction of the optical disk medium, wherein each of the address segments has a plurality of blank subunits without the format modulation area provided in consecutive manner at the head or end thereof, where the number of the blank subunits is equivalent to a predetermined integer or more, and where the integer is obtained by dividing the number k of subunits forming the address segment by three and a remainder thereof is omitted, wherein the recording track comprises:

at least one first-type address segment, wherein, in each of the subunits other than the blank subunits, the format modulation area is provided in the first modulation area;

at least one second-type address segment, wherein, in each of the subunits other than the blank subunits, the format modulation area is provided in the second modulation area; and at least one third-type address segment, wherein consecutive subunits of the subunits other than the blank subunits have the format modulation area in the first modulation area, wherein the number of the consecutive subunits is equivalent to a predetermined integer obtained by dividing the subunit number k by three, wherein a remainder resulting from the division is either omitted or the consecutive sub units are raised by a unit when the remainder results from the division, and wherein the other consecutive subunits have the format modulation area in the second modulation area, where the number of the other consecutive subunits is equivalent to the predetermined integer obtained by dividing the subunit number k by three.

5. An optical disk medium according to claim 3, wherein the subunit provided at the head in each of the address segment includes the format modulation area having a special modulation pattern, and wherein information for determining whether the format modulation area is in the first modulation area or the second modulation area is provided in the address segment.

6. An optical disk medium according to claim 4, wherein the subunit provided at the head in each of the address segment includes the format modulation area comprises a special modulation pattern, and wherein the address segment comprises information for determining whether the format modulation area is in the first modulation area or the second modulation area.

7. An optical disk medium according to claim 3, wherein each of the address segments comprises information for determining the type thereof or that of other address segment next thereto.

8. An optical disk medium according to claim 4, wherein each of the address segments comprises information for determining the type thereof or that of other address segment next thereto.

* * * * *